No. 867,400. PATENTED OCT. 1, 1907.
R. J. McINTYRE.
BRAKE MECHANISM.
APPLICATION FILED JUNE 17, 1907.
2 SHEETS—SHEET 1.
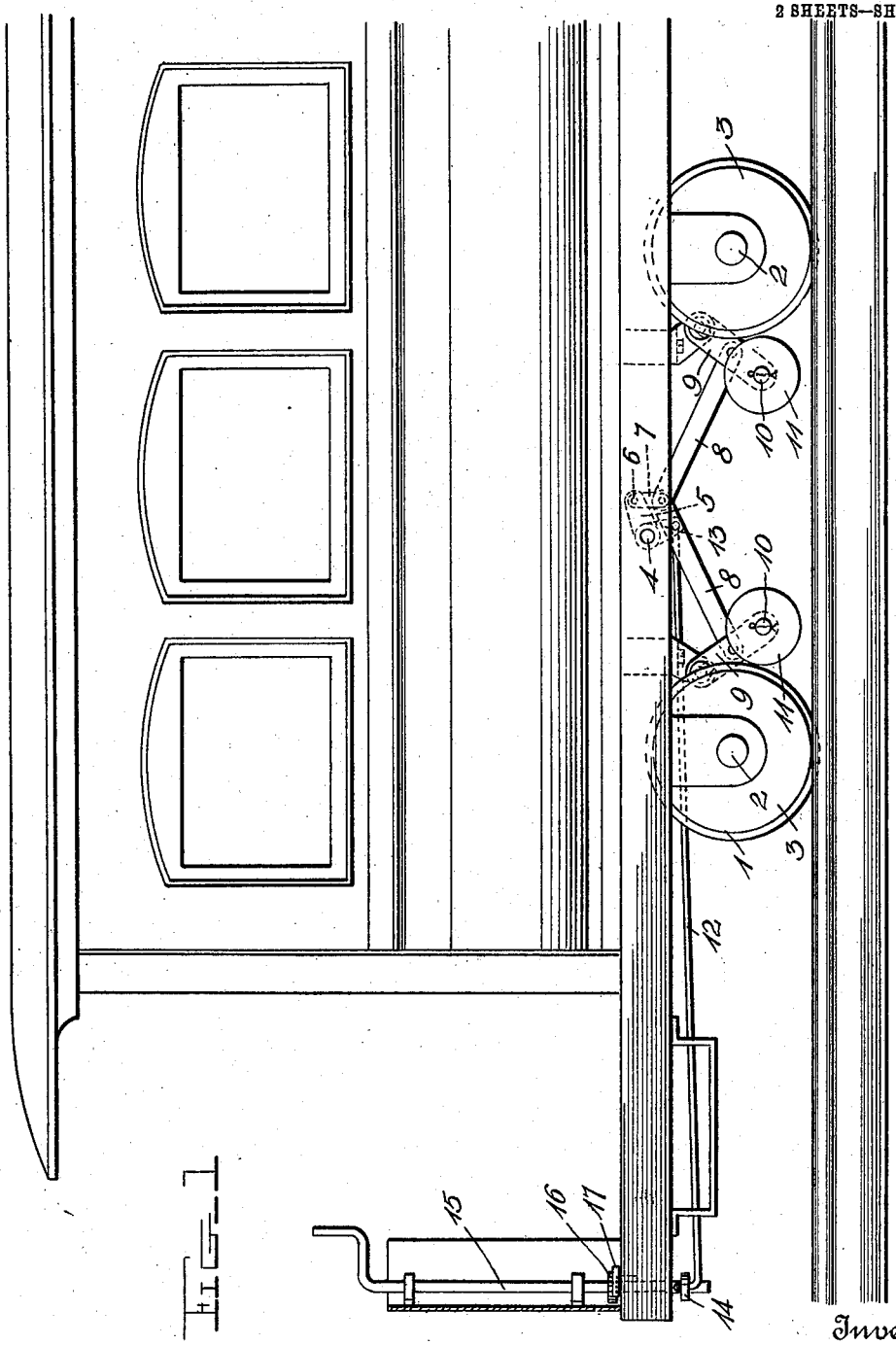
Witnesses
Inventor
Robert J. McIntyre
by H. B. Willson & Co
Attorneys No. 867,400.　　　　　　　　　　　　　　　　PATENTED OCT. 1, 1907.
R. J. McINTYRE.
BRAKE MECHANISM.
APPLICATION FILED JUNE 17, 1907.
2 SHEETS—SHEET 2.
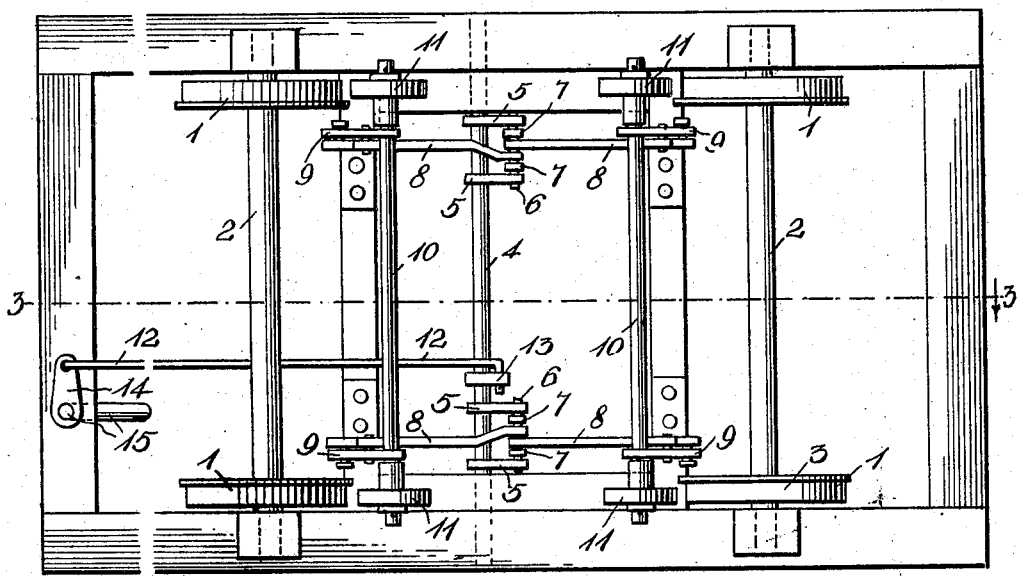
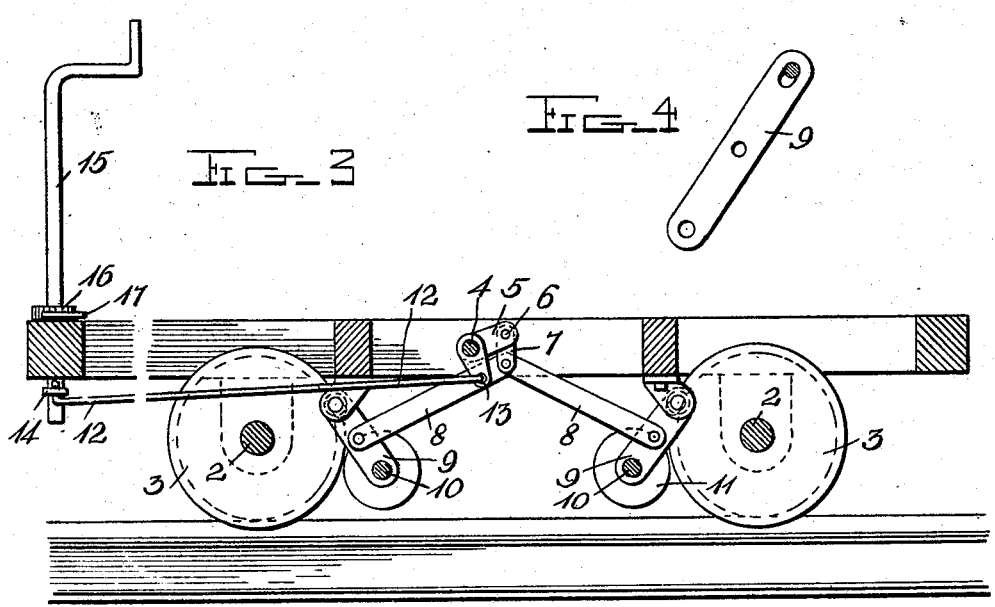
Witnesses
Inventor
Robert J. McIntyre
by H. B. Willson & Co.
Attorneys

UNITED STATES PATENT OFFICE.

ROBERT J. McINTYRE, OF ALLENTOWN, PENNSYLVANIA.

BRAKE MECHANISM.

No. 867,400.          Specification of Letters Patent.          Patented Oct. 1, 1907.

Application filed June 17, 1907. Serial No. 379,444.

*To all whom it may concern:*

Be it known that I, ROBERT J. MCINTYRE, a citizen of the United States, residing at Allentown, in the county of Lehigh and State of Pennsylvania, have invented certain new and useful Improvements in a Brake Mechanism; and I do declare the following to be a full, clear, and exact description of the invention, such as will enable others skilled in the art to which it appertains to make and use the same.

This invention has relation to new and useful improvements in brake mechanisms and while it is especially adapted for use in connection with railway street cars, it may be applied to any wheeled vehicle adapted to run on a track.

One of the objects of the invention is to provide a simple and economical mechanism of this character adapted to be attached in operative position beneath a car whereby the same may be brought to a stop almost instantly should occasion necessitate.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a side elevation of a brake mechanism constructed in accordance with the invention attached in position to a street railway car; Fig. 2 is a bottom plan view of the car truck with the brake mechanism in position; Fig. 3 is a longitudinal section on the line 3—3 of Fig. 2, looking in the direction indicated by the arrows; and Fig. 4 is an enlarged detail view of one of the brake wheel hangers.

Referring to the drawings for a more particular description of the invention, the numerals 1, 2 and 3 indicate respectively the rim, axles and wheels of an ordinary car truck.

A rock shaft or rod 4 is journaled to and transversely of the truck between the front and rear truck wheels and is provided near each end with a pair of rearwardly extending oppositely disposed spaced arms 5. A cross supporting rod 6 is arranged between the free ends of each pair of said arms and has loosely connected to it the upper ends of a pair of vertically disposed spaced connecting links 7 connected at their free ends to the inner ends of two oppositely extending longitudinally disposed oblique connecting bars 8 arranged at each side of the car under the truck frame. The outer or free ends of said connecting bars 8 are connected intermediately of the ends of vertically disposed hangers 9 pivotally connected at their inner or upper ends by suitable means under the truck frame adjacent the truck wheels. Axles 10 are arranged transversely of the truck frame and extend through and beyond the free ends of said hangers and journaled to the ends of said axles in position to frictionally engage the peripheries of the truck wheels 3 are suitable brake wheels or rollers 11. A longitudinally disposed operating rod 2 is connected at its rear end to a suitable arm or extension 13 depending at a suitable point from said rock shaft or rod 4 and is connected at its opposite or front end to the free end of a horizontally disposed arm or extension 14 fixed to the lower end of a vertically disposed brake operating lever 15 below the truck frame. Said lever is provided at a suitable point near the platform of a car with the usual ratchet and pawl 16 and 17 for holding it against rotation when the brake wheels are being thrown in engagement with the truck wheels.

The brake wheels when the truck mechanism is not in use are maintained above the track rails and the upper ends of the hangers or the points where they are pivotally connected to the truck frame are slotted longitudinally to permit the brake wheels to move in a horizontal plane to engage the truck wheels after engaging the track rails. From the foregoing it will be seen that the brake wheels engage both the truck wheels and rails at the same time, causing them to rotate in a reverse direction thereto. By this arrangement the car may be checked or brought to a stop almost instantly should it become necessary.

From the foregoing description taken in connection with the accompanying drawings, the construction and operation of the invention will be readily understood without requiring a more extended explanation.

I claim as my invention:—

1. The combination with a wheeled truck adapted to run on a track, of vertically disposed hangers arranged beneath said truck adjacent the wheels thereof, transversely disposed axles supported by said hangers, brake wheels journaled to said axles in position to engage the track rails and vehicle wheels, and a mechanism coacting with said hangers and axles for maintaining the brake wheels in disengagement with the track rails and vehicle wheels.

2. The combination with a wheeled truck adapted to run on a track, of a transversely disposed rock shaft arranged between the front and rear truck wheels, brake wheels journaled below the truck frame in position to engage the peripheries of the truck wheels and the track rails, means for connecting said brake wheels with the rock shaft, and means carried by the truck for rocking the rock shaft in either direction to throw the brake wheels in and out of engagement with the truck wheels and track rails.

3. The combination with a truck adapted to run on a track, of a transversely disposed rock shaft arranged between the front and rear truck wheels, vertically disposed hangers free for limited endwise movement pivotally connected beneath the truck frame adjacent the truck wheels, means for connecting the hangers with said rock shaft, brake wheels journaled to said hangers in position to engage the truck wheels and track rails, and means for rocking the rock shaft in either direction to throw said brake wheels in and out of engagement therewith.

In testimony whereof I have hereunto set my hand in presence of two subscribing witnesses.

ROBERT J. MCINTYRE.

Witnesses:
GEORGE E. BOYLE,
MAME M. BOYLE.